Sept. 1, 1970 D. EYRE 3,526,466

ROTOR FOR USE ON A ROTARY WING AIRCRAFT

Filed July 2, 1968 3 Sheets-Sheet 1

INVENTOR
DONALD EYRE

By
Cushman Darby & Cushman
ATTORNEYS

Sept. 1, 1970  D. EYRE  3,526,466

ROTOR FOR USE ON A ROTARY WING AIRCRAFT

Filed July 2, 1968  3 Sheets-Sheet 3

INVENTOR
DONALD EYRE

United States Patent Office

3,526,466
Patented Sept. 1, 1970

3,526,466
ROTOR FOR USE ON A ROTARY WING AIRCRAFT
Donald Eyre, Alvaston, Derby, England, assignor to Rolls-Royce Limited, Derby, England, a British company
Filed July 2, 1968, Ser. No. 741,997
Claims priority, application Great Britain, July 13, 1967, 32,379/67
Int. Cl. B64c 27/18
U.S. Cl. 416—21    8 Claims

ABSTRACT OF THE DISCLOSURE

A rotor assembly for use on rotary wing aircraft, the rotor assembly including a rotor hub having a plurality of rotor blades mounted thereon and a plurality of gas turbine engines carried within the rotor hub, the gas turbine engines being arranged to rotate the hub in the same angular sense. The rotor blades are provided with slots, and means driven by the engines supplies compressed air to the blades and slots, and discharges the same from the slots, the slots being arranged to direct the compressed air so as to provide lift for the blades. Exhaust gases from the gas turbine engines are discharged through nozzles provide on the rotor hub and arranged to direct the exhaust gases so as to at least assist in rotation of the hub and the blades.

---

This invention concerns a rotor for use on a rotary wing aircraft.

The rotary wing aircraft may, for example, be a helicopter which may be either a passenger carrying helicopter or a flying crane.

According to the present invention, there is provided a rotor hub provided with a plurality of rotor blades, there being mounted within the rotor hub a plurality of gas turbine engines which are arranged to rotate the rotor hub in the same angular sense.

Preferably, except in an emergency, each of the engines is arranged to be operated at all times at substantially below its maximum output, whereby if an engine fails, the output of the remaining engine or engines can be increased to compensate. Thus, for example, each engine may be normally arranged to be operated at not more than 70% of its maximum output.

The rotor hub may be provided with nozzles which are arranged to receive the exhaust gases of the engines, the said nozzles directing the exhaust gases substantially tangentially of the rotor hub to assist the rotation of the latter.

Each engine is preferably provided with means for supplying compressed air to the rotor blades.

The rotor blades may be provided with slots through which at least part of the compressed air passes to atmosphere, thereby providing lift.

Additionally, or alternatively, the rotor blades may be provided with reaction jets or by-pass fan units which are arranged to rotate the rotor blades and to which at least part of the said compressed air is supplied.

Each engine may drive a fan which supplies the said compressed air Thus, each. engine may have a free turbine (e.g. a radial flow turbine) which is driven by the exhaust gases of the engine and which drives the respective fan. Moreover, each fan may have at least one centrifugal flow stage.

Preferably there are two only of such engines, the two engines being arranged back to back with one vertically above the other.

Each engine may be provided with a respective volute which receives compressed air from the respective engine and supplies the compressed air to two diametrically oppositely disposed rotor blades.

Alternatively, the compressed air from each engine may be supplied to a common volute from which the compressed air passes to all the rotor blades.

The invention also comprises a rotary wing aircraft, e.g. a helicopter, provided with a rotor as set forth above.

The invention is illustrated, merely by way of example, in the accompanying drawings, in which.

Figure 1:
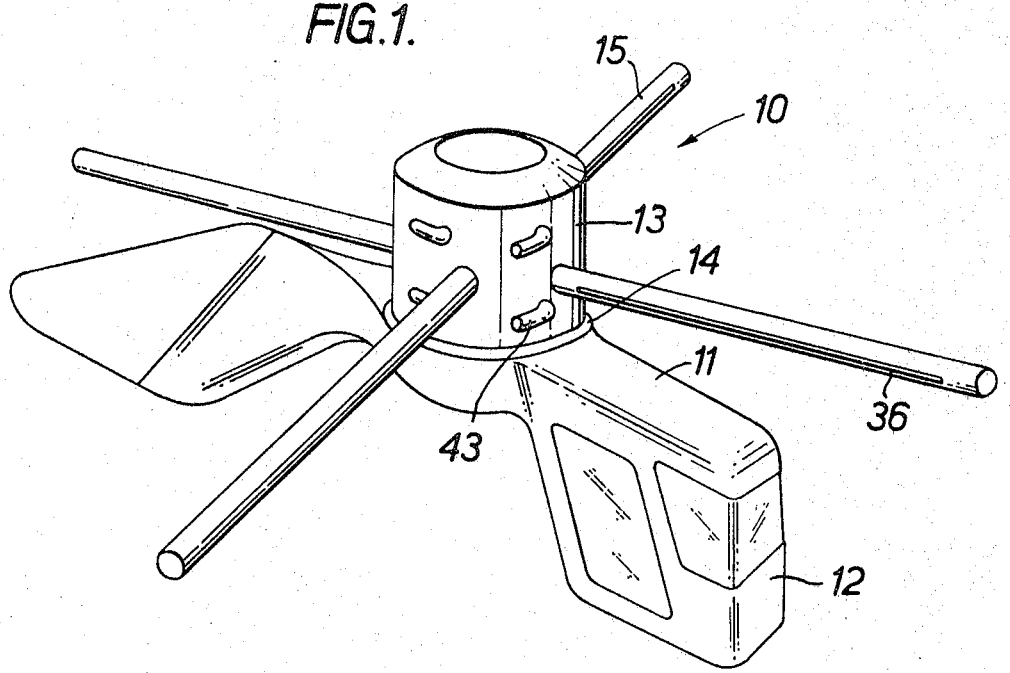
FIG. 1 is a diagrammatic perspective view of a helicopter provided with a rotor in accordance with the present invention.
Figure 2:
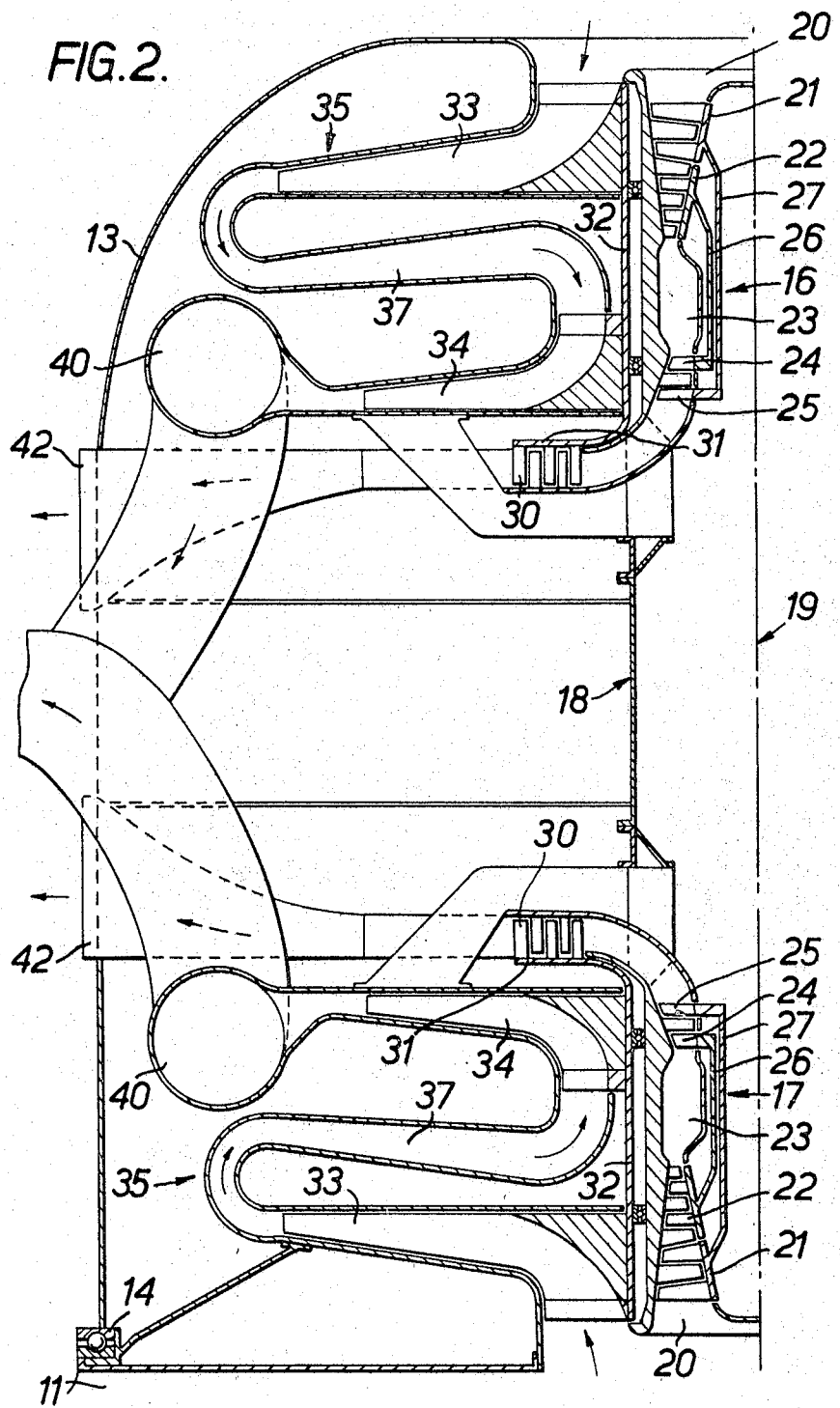
FIG. 2 is a broken-away sectional view showing part of the rotor hub of the helicopter of FIG. 1, and FIGS. 3 and 4 are diagrammatic views of alternative forms of rotor hub.

In FIG. 1 there is shown a helicopter 10 which is formed as a flying crane and which has a body structure 11 which includes a cabin 12 for the operator.

A rotor hub 13 is rotatably mounted at the top of the body structure 11 by means of a bearing 14 through which the lifting loads may be transmitted. The rotor hub 13 is provided with four equi-angularly spaced apart rotor blades 15.

Mounted within the rotor hub 13 are two gas turbine engines 16, 17 which are arranged back to back with one vertically above the other, the exhaust gases from the engines being arranged to rotate the rotor hub 13 in the same angular sense. The engines 16, 17, which are interconnected by fixed structure 18, are arranged about a common vertical axis of rotation 19.

Each of the engines 16, 17 is provided in flow series with an air intake 20, a two stage, axial flow, low pressure compressor 21, a two stage, axial flow, high pressure compressor 22, combustion equipment 23, a single stage, axial flow, high pressure turbine 24, and a single stage, axial flow, low pressure turbine 25. The high pressure compressor 22 of each engine is driven by the respective high pressure turbine 24 by way of a shaft 26. Each shaft 26 is mounted concentrically about a shaft 27 which transmits drive from the respective low pressure turbines 25 to the respective low pressure compressor 21. As will be seen, the air inlets 20 of the engines 16, 17 are respectively provided at the top and bottom of the rotor hub 13.

Each of the engines 16, 17 is provided with a three-stage, radial flow, free turbine 30 which is driven by the exhaust gases of the respective engine. Each of the free turbines 30 is mounted on a radially extending portion 31 of the shaft whose main portion 32 extends axially of the respective engine. The shaft 32 of each engine carries two vertically spaced apart, centrifugal flow, rotor stages 33, 34 of a fan 35 which is thus driven by the respective engine. Each fan 35 supplies compressed air to the rotor blades 15.

At least part of this compressed air passes to atmosphere through slots 36 in the rotor blades 15 to provide lift. If desired, moreover, the rotor blades 15 may be rotated by supplying some of the compressed air to reaction jets, e.g. tip reaction jets, (not shown) which are mounted on the rotor blades 15 and in which fuel may be burnt. Alternatively some of the compressed air may be supplied to by-pass fan units (not shown) which are mounted on the rotor blades 15 to effect rotation of the blades.

The rotor stages 33, 34 of each fan 35 cause the air passing therethrough to be forced radially outwardly, passages 37 being provided to supply the air compressed by the stage 33 to the inlet of the stage 34.

Figure 3:
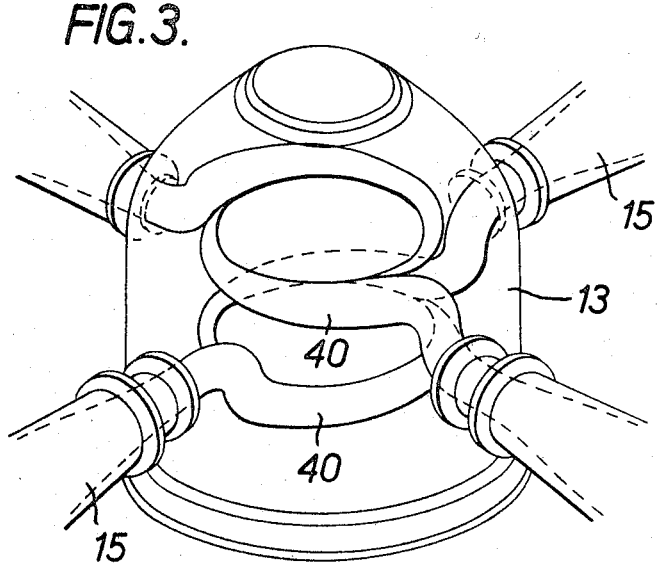

The air which has been compressed by each fan 35 is supplied to a respective volute 40. As will be seen from FIG. 3, each of the volutes 40 may supply the compressed air which it has received from the respective engines 16, 17 to two diametrically oppositely disposed rotor blades 15.

Figure 4:
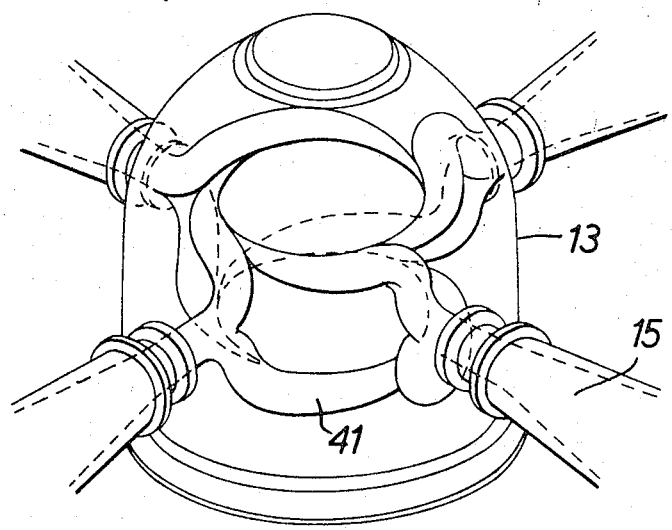

Alternatively, as shown in FIG. 4, the compressed air produced by each of the fans 35 may be supplied to a common volute 41, from which the compressed air may pass to all four of the rotor blades 15.

The exhaust gases from each of the engines 16, 17 which have passed through the respective free turbine 30 are supplied via a conduit 42 to a plurality of elbow-shaped nozzles 43 (FIG. 1) which are mounted on the rotor hub 13, the nozzles 43 directing the exhaust gases substantially tangentially of the rotor hub 13 to assist in rotating the latter.

As will be appreciated, the engines 16, 17 thus rotate the rotor hub 13 in the same angular sense. It is, moreover, arranged that, except in an emergency, each of the engines 16, 17 is arranged to be operated at all times at, say, about 70% of its maximum output. Thus, if either of the engines 16, 17 fails, the output of the other engine can be increased to compensate so as to maintain the helicopter in flight.

I claim:

1. A rotor assembly for use on a rotary wing aircraft, said rotor assembly comprising: a rotor hub; a plurality of rotor blades carried by said hub for rotation therewith, said rotor blades having slots therein arranged to direct compressed air passing through the blades to provide lift for the blades; a plurality of gas turbine engines mounted within said rotor hub; a plurality of nozzles carried on said rotor hub and arranged to receive exhaust gases from said engines and direct the same substantially tangential to said rotor hub for assisting rotation of the rotor hub and the blades; and means driven by said engines for receiving ambient air, compressing the same, and delivering at least a part of the compressed air through the blades for passing to atmosphere by way of the slots therein.

2. A rotor assembly as claimed in claim 1, in which said means driven by said engines is a fan.

3. A rotor assembly as claimed in claim 2, in which each of said engines has a free turbine driven by the exhaust gases of the engine, said free turbine being arranged to drive the respective fan.

4. A rotor assembly as claimed in claim 3 in which each fan has at least one centrifugal flow stage.

5. A rotor assembly as claimed in claim 3 in which the free turbine is a radial flow turbine.

6. A rotor assembly as claimed in claim 1 in which there are two only of such engines, the two engines being arranged back to back with one vertically above the other.

7. A rotor assembly as claimed in claim 6, including a volute for receiving compressed air from each of said means driven by said engines, each of said volutes supplying compressed air to two diametrically oppositely disposed rotor blades.

8. A rotor assembly as claimed in claim 6 including a common volute for receiving compressed air from said means driven by said engines, said common volute supplying compressed air to all of said rotor blades.

References Cited

UNITED STATES PATENTS

| | | | |
|---|---|---|---|
| 2,689,615 | 9/1954 | Fletcher | 170—135.4 X |
| 2,814,349 | 11/1957 | Berry | 170—135.4 |
| 2,894,589 | 7/1959 | Ehrich | 170—135.4 |
| 3,211,397 | 10/1965 | Laing et al. | 170—135.4 X |

FOREIGN PATENTS

| | | |
|---|---|---|
| 756,050 | 8/1956 | Great Britain. |
| 861,407 | 2/1961 | Great Britain. |
| 938,459 | 10/1963 | Great Britain. |

EVERETTE A. POWELL, Jr., Primary Examiner

U.S. Cl. X.R.

416—90